(12) United States Patent
Kawakami et al.

(10) Patent No.: US 11,871,154 B2
(45) Date of Patent: *Jan. 9, 2024

(54) VIDEO DISTRIBUTION SERVER, VIDEO DISTRIBUTION METHOD AND RECORDING MEDIUM

(71) Applicant: DWANGO Co., Ltd., Tokyo (JP)

(72) Inventors: Nobuo Kawakami, Tokyo (JP); Hiroki Shimomura, Tokyo (JP); Takashi Kojima, Tokyo (JP)

(73) Assignee: DWANGO CO., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/509,622

(22) Filed: Oct. 25, 2021

(65) Prior Publication Data

US 2022/0086396 A1    Mar. 17, 2022

Related U.S. Application Data

(63) Continuation of application No. 16/609,277, filed as application No. PCT/JP2018/043343 on Nov. 26, 2018, now Pat. No. 11,190,736.

(30) Foreign Application Priority Data

Nov. 27, 2017 (JP) .................... 2017-226881

(51) Int. Cl.
*H04N 7/173* (2011.01)
*H04N 21/258* (2011.01)
(Continued)

(52) U.S. Cl.
CPC ... *H04N 7/17318* (2013.01); *H04N 21/25891* (2013.01); *H04N 21/4622* (2013.01); *H04N 21/47202* (2013.01); *H04N 21/812* (2013.01)

(58) Field of Classification Search
None
See application file for complete search history.

(56) References Cited

U.S. PATENT DOCUMENTS 5,848,396 A * 12/1998 Gerace .................. H04L 9/40
705/7.29
6,282,713 B1 * 8/2001 Kitsukawa ......... H04N 21/4784
725/36
(Continued)

FOREIGN PATENT DOCUMENTS

| CN | 1315113 A | 9/2001 |
| CN | 102523494 A | 6/2012 |

(Continued)

OTHER PUBLICATIONS

Translation of International Search Report and Written Opinion dated Dec. 25, 2018 in corresponding application No. PCT/JP2018/043343; 7 pgs.
(Continued)

*Primary Examiner* — An Son P Huynh
(74) *Attorney, Agent, or Firm* — Maier & Maier, PLLC

(57) ABSTRACT

This video distribution server which receives moving images from an originating terminal and distributes these moving images to a viewer terminal implements a questionnaire within the broadcast on the basis of commands from the originating terminal and provides the same questionnaire to a Web server.

20 Claims, 11 Drawing Sheets

(51) Int. Cl.
  *H04N 21/462* (2011.01)
  *H04N 21/472* (2011.01)
  *H04N 21/81* (2011.01)

(56) References Cited

U.S. PATENT DOCUMENTS

| | | | | |
|---|---|---|---|---|
| 7,065,778 | B1* | 6/2006 | Lu | H04N 21/4147 |
| | | | | 348/E7.071 |
| 7,117,517 | B1* | 10/2006 | Milazzo | H04N 21/435 |
| | | | | 375/E7.008 |
| 7,143,428 | B1* | 11/2006 | Bruck | H04N 21/6175 |
| | | | | 709/204 |
| 7,577,979 | B2* | 8/2009 | Feinleib | H04N 21/4886 |
| | | | | 709/219 |
| 7,594,177 | B2* | 9/2009 | Jojic | G06F 16/739 |
| | | | | 715/721 |
| 7,950,041 | B2* | 5/2011 | Sakamoto | H04N 7/17318 |
| | | | | 725/112 |
| 8,290,351 | B2* | 10/2012 | Plotnick | H04N 21/8586 |
| | | | | 386/344 |
| 8,352,980 | B2* | 1/2013 | Howcroft | H04N 21/25891 |
| | | | | 725/35 |
| 8,589,975 | B2* | 11/2013 | McKissick | H04N 21/47214 |
| | | | | 725/39 |
| 8,661,464 | B2* | 2/2014 | Arankalle | G06Q 30/0275 |
| | | | | 725/32 |
| 8,813,132 | B2* | 8/2014 | Andrews, II | G06F 3/04847 |
| | | | | 725/139 |
| 8,839,306 | B2* | 9/2014 | Roberts | H04N 21/4722 |
| | | | | 725/60 |
| 8,977,987 | B1* | 3/2015 | Korn | G06F 3/0346 |
| | | | | 715/702 |
| 9,369,778 | B2* | 6/2016 | Sangal | H04N 21/25891 |
| 9,420,320 | B2 | 8/2016 | Doe | |
| 9,565,476 | B2* | 2/2017 | Bakke | H04N 21/42224 |
| 9,571,900 | B2* | 2/2017 | Slothouber | H04N 21/812 |
| 9,973,819 | B1* | 5/2018 | Taylor | G06Q 30/0643 |
| 10,021,458 | B1* | 7/2018 | Taylor | H04N 21/2187 |
| 10,075,775 | B2* | 9/2018 | Cain | H04N 21/434 |
| 10,194,189 | B1* | 1/2019 | Goetz | H04N 21/43079 |
| 10,277,944 | B2* | 4/2019 | Venetucci | H04H 60/64 |
| 10,440,436 | B1* | 10/2019 | Taylor | H04N 21/812 |
| 10,904,617 | B1* | 1/2021 | Labarre | H04N 21/233 |
| 2001/0001160 | A1* | 5/2001 | Shoff | H04N 21/4312 |
| | | | | 725/108 |
| 2002/0013950 | A1* | 1/2002 | Tomsen | H04N 21/254 |
| | | | | 725/51 |
| 2002/0032904 | A1* | 3/2002 | Lerner | H04N 21/6582 |
| | | | | 725/110 |
| 2002/0056087 | A1* | 5/2002 | Berezowski | H04N 21/488 |
| | | | | 348/E7.071 |
| 2002/0065678 | A1* | 5/2002 | Peliotis | H04N 7/163 |
| | | | | 348/E5.103 |
| 2002/0087402 | A1* | 7/2002 | Zustak | G06Q 30/0601 |
| | | | | 705/26.1 |
| 2002/0120931 | A1* | 8/2002 | Huber | H04N 7/17318 |
| | | | | 348/E7.071 |
| 2002/0120934 | A1* | 8/2002 | Abrahams | H04N 21/4316 |
| | | | | 348/E7.071 |
| 2002/0131511 | A1* | 9/2002 | Zenoni | H04N 21/44016 |
| | | | | 348/521 |
| 2002/0178441 | A1* | 11/2002 | Hashimoto | H04N 21/25891 |
| | | | | 348/E7.071 |
| 2003/0145338 | A1* | 7/2003 | Harrington | H04N 21/8193 |
| | | | | 725/86 |
| 2003/0149983 | A1* | 8/2003 | Markel | H04N 21/4725 |
| | | | | 348/E7.054 |
| 2005/0028208 | A1* | 2/2005 | Ellis | H04N 21/4755 |
| | | | | 348/E7.071 |
| 2005/0149964 | A1* | 7/2005 | Thomas | H04N 21/482 |
| | | | | 348/E7.071 |
| 2005/0262542 | A1* | 11/2005 | DeWeese | H04N 21/254 |
| | | | | 348/E7.071 |
| 2006/0026067 | A1* | 2/2006 | Nicholas | G06Q 30/0261 |
| | | | | 705/14.58 |
| 2007/0136753 | A1* | 6/2007 | Bovenschulte | H04N 21/44224 |
| | | | | 348/E7.071 |
| 2007/0192166 | A1* | 8/2007 | Van Luchene | G06Q 30/02 |
| | | | | 705/14.54 |
| 2007/0206606 | A1* | 9/2007 | Coleman | H04L 65/1101 |
| | | | | 370/395.52 |
| 2007/0226761 | A1* | 9/2007 | Zalewski | H04N 21/478 |
| | | | | 725/35 |
| 2007/0268406 | A1* | 11/2007 | Bennett | H04N 7/0122 |
| | | | | 348/565 |
| 2008/0077478 | A1* | 3/2008 | Kim | G06Q 30/0224 |
| | | | | 705/7.32 |
| 2008/0086742 | A1* | 4/2008 | Aldrey | H04H 60/33 |
| | | | | 725/24 |
| 2008/0146342 | A1* | 6/2008 | Harvey | A63F 13/30 |
| | | | | 463/42 |
| 2009/0027337 | A1* | 1/2009 | Hildreth | G06F 3/017 |
| | | | | 345/158 |
| 2009/0083815 | A1* | 3/2009 | McMaster | H04N 21/8586 |
| | | | | 725/110 |
| 2009/0089840 | A1* | 4/2009 | Shusman | H04N 21/854 |
| | | | | 725/51 |
| 2009/0158374 | A1 | 6/2009 | Malaure et al. | |
| 2009/0210790 | A1* | 8/2009 | Thomas | H04N 21/8545 |
| | | | | 715/719 |
| 2009/0276805 | A1* | 11/2009 | Andrews, II | H04N 21/2547 |
| | | | | 725/38 |
| 2010/0064259 | A1* | 3/2010 | Alexanderovitc | G06F 3/04815 |
| | | | | 715/852 |
| 2010/0064306 | A1* | 3/2010 | Tiongson | H04N 21/4758 |
| | | | | 725/62 |
| 2010/0097309 | A1* | 4/2010 | Nishida | A63F 13/426 |
| | | | | 345/156 |
| 2010/0153831 | A1* | 6/2010 | Beaton | G06Q 30/02 |
| | | | | 715/201 |
| 2010/0161409 | A1* | 6/2010 | Ryu | G06Q 30/02 |
| | | | | 705/14.43 |
| 2010/0192181 | A1* | 7/2010 | Friedman | H04N 21/4355 |
| | | | | 725/44 |
| 2010/0251318 | A1 | 9/2010 | Simoes et al. | |
| 2010/0287592 | A1* | 11/2010 | Patten | H04N 21/2383 |
| | | | | 725/59 |
| 2010/0321389 | A1* | 12/2010 | Gay | G06T 15/00 |
| | | | | 345/427 |
| 2011/0058107 | A1* | 3/2011 | Sun | G06F 3/0346 |
| | | | | 348/734 |
| 2011/0063415 | A1* | 3/2011 | Gefen | H04N 21/8133 |
| | | | | 348/42 |
| 2011/0115887 | A1* | 5/2011 | Yoo | H04N 13/398 |
| | | | | 348/51 |
| 2011/0138317 | A1* | 6/2011 | Kang | H04N 21/42224 |
| | | | | 715/780 |
| 2011/0138416 | A1* | 6/2011 | Kang | H04N 21/4821 |
| | | | | 725/39 |
| 2011/0145856 | A1* | 6/2011 | Agarwal | H04N 21/6581 |
| | | | | 725/32 |
| 2011/0164175 | A1* | 7/2011 | Chung | H04N 21/42209 |
| | | | | 348/468 |
| 2011/0247037 | A1* | 10/2011 | Pandey | H04N 21/47 |
| | | | | 725/39 |
| 2011/0254792 | A1* | 10/2011 | Waters | G06F 1/1626 |
| | | | | 345/173 |
| 2011/0282906 | A1* | 11/2011 | Wong | G06F 16/784 |
| | | | | 707/E17.03 |
| 2012/0030637 | A1* | 2/2012 | Dey | G06F 3/017 |
| | | | | 715/863 |
| 2012/0072420 | A1* | 3/2012 | Moganti | G06F 16/7837 |
| | | | | 707/737 |
| 2012/0137316 | A1* | 5/2012 | Elizarov | G06Q 30/0242 |
| | | | | 725/9 |
| 2012/0208466 | A1* | 8/2012 | Park | H04N 21/4108 |
| | | | | 455/41.3 |
| 2012/0239529 | A1* | 9/2012 | Low | G06Q 20/12 |
| | | | | 705/26.41 |

(56) References Cited

U.S. PATENT DOCUMENTS

| | | | |
|---|---|---|---|
| 2012/0254911 A1* | 10/2012 | Doe | H04N 21/4524 725/14 |
| 2012/0289147 A1* | 11/2012 | Raleigh | H04N 21/25808 455/3.06 |
| 2012/0315881 A1* | 12/2012 | Woloshyn | G06Q 10/10 455/412.2 |
| 2013/0016910 A1* | 1/2013 | Murata | H04N 21/8583 382/195 |
| 2013/0031582 A1* | 1/2013 | Tinsman | H04N 21/4316 725/36 |
| 2013/0036442 A1* | 2/2013 | Wingert | H04N 21/42209 725/60 |
| 2013/0061262 A1* | 3/2013 | Briggs | H04N 21/8455 725/32 |
| 2013/0091515 A1* | 4/2013 | Sakata | H04N 17/04 725/10 |
| 2013/0125045 A1* | 5/2013 | Sun | G06F 3/04883 715/788 |
| 2013/0227619 A1* | 8/2013 | Lewis | H01Q 1/44 348/E5.113 |
| 2013/0241925 A1* | 9/2013 | Konami | G06F 3/013 345/419 |
| 2013/0297690 A1* | 11/2013 | Lucero | H04W 48/16 709/204 |
| 2013/0298146 A1* | 11/2013 | Conrad | H04N 21/44213 725/35 |
| 2013/0321265 A1* | 12/2013 | Bychkov | G06F 3/011 345/156 |
| 2014/0040955 A1* | 2/2014 | McKissick | H04N 21/47214 725/40 |
| 2014/0067828 A1* | 3/2014 | Archibong | H04N 21/84 707/748 |
| 2014/0068692 A1* | 3/2014 | Archibong | H04N 21/6334 725/116 |
| 2014/0078402 A1* | 3/2014 | Weast | H04N 21/44218 348/730 |
| 2014/0081954 A1* | 3/2014 | Elizarov | H04N 21/4788 707/722 |
| 2014/0150019 A1* | 5/2014 | Ma | H04N 21/458 725/34 |
| 2014/0168056 A1* | 6/2014 | Swaminathan | G06V 40/19 345/156 |
| 2014/0195918 A1* | 7/2014 | Friedlander | G06F 3/04842 715/830 |
| 2014/0210714 A1* | 7/2014 | Kang | G06F 3/0483 345/158 |
| 2014/0215508 A1* | 7/2014 | Wyatt | H04N 5/262 725/24 |
| 2014/0215542 A1* | 7/2014 | Terpe | H04N 21/858 725/112 |
| 2014/0282660 A1* | 9/2014 | Oztaskent | H04N 21/4725 725/38 |
| 2015/0106856 A1* | 4/2015 | Rankine | H04N 21/8456 725/60 |
| 2015/0113555 A1* | 4/2015 | Bonvolanta | H04N 21/812 725/32 |
| 2015/0138044 A1* | 5/2015 | Rawlinson | B60N 2/02 345/2.2 |
| 2015/0172775 A1* | 6/2015 | Yee | H04N 21/6587 725/37 |
| 2015/0234820 A1* | 8/2015 | Aravamudan | H04N 21/4826 707/769 |
| 2015/0244747 A1* | 8/2015 | Wickenkamp | G06F 3/0482 726/28 |
| 2015/0254300 A1* | 9/2015 | Yeh | G06F 16/955 707/758 |
| 2015/0296250 A1* | 10/2015 | Casper | G06Q 30/0267 725/34 |
| 2015/0311992 A1* | 10/2015 | Aston | H04N 21/8173 725/24 |
| 2015/0373396 A1* | 12/2015 | Makhlouf | H04N 21/222 725/34 |
| 2016/0006981 A1* | 1/2016 | Bauman | H04N 21/4788 348/14.03 |
| 2016/0021412 A1* | 1/2016 | Zito, Jr. | H04N 21/488 725/13 |
| 2016/0034143 A1* | 2/2016 | Sharma | G06F 3/0346 715/810 |
| 2016/0073055 A1* | 3/2016 | Marsh | H04N 7/152 348/14.08 |
| 2016/0094790 A1* | 3/2016 | Yu | H04N 5/23216 348/169 |
| 2016/0132173 A1* | 5/2016 | Kim | G06F 1/1694 345/173 |
| 2016/0191964 A1* | 6/2016 | Corwin | H04N 21/4758 725/24 |
| 2016/0205442 A1* | 7/2016 | Yee | H04N 21/812 725/34 |
| 2016/0205447 A1* | 7/2016 | Liden | H04N 21/84 725/19 |
| 2016/0212466 A1* | 7/2016 | Nauseef | H04N 21/4223 |
| 2016/0286244 A1* | 9/2016 | Chang | H04N 21/4788 |
| 2016/0366464 A1* | 12/2016 | Rouady | H04N 21/4312 |
| 2016/0381427 A1* | 12/2016 | Taylor | H04N 21/472 725/13 |
| 2017/0006322 A1* | 1/2017 | Dury | H04N 21/254 |
| 2017/0013031 A1* | 1/2017 | Kweon | H04L 67/56 |
| 2017/0097677 A1* | 4/2017 | McLean | G09G 5/12 |
| 2017/0099455 A1* | 4/2017 | Mazzarella | H04W 4/08 |
| 2017/0103664 A1* | 4/2017 | Wong | G09B 5/065 |
| 2017/0212583 A1* | 7/2017 | Krasadakis | G06F 3/0482 |
| 2017/0264920 A1* | 9/2017 | Mickelsen | H04N 21/44218 |
| 2017/0270547 A1* | 9/2017 | Poltz | G06Q 30/0205 |
| 2017/0357431 A1* | 12/2017 | Chang | G01C 21/362 |
| 2017/0366867 A1* | 12/2017 | Davies | H04N 21/8133 |
| 2018/0001200 A1* | 1/2018 | Tokgoz | A63F 13/52 |
| 2018/0146216 A1* | 5/2018 | Chang | H04L 67/01 |
| 2018/0152760 A1 | 5/2018 | Venetucci et al. | |
| 2018/0164876 A1* | 6/2018 | Smit | G06T 19/006 |
| 2018/0253160 A1* | 9/2018 | Bashford | G06F 3/0346 |
| 2018/0307397 A1* | 10/2018 | Hastings | G06F 3/0484 |
| 2019/0191203 A1* | 6/2019 | Asbun | H04N 21/4316 |
| 2019/0191219 A1 | 6/2019 | Kulkarni | |
| 2019/0253743 A1* | 8/2019 | Tanaka | H04N 21/812 |
| 2020/0076754 A1* | 3/2020 | Kim | H04L 51/222 |

FOREIGN PATENT DOCUMENTS

| | | |
|---|---|---|
| CN | 104035647 A | 9/2014 |
| CN | 107040805 A | 8/2017 |
| EP | 237556 A1 | 10/2010 |
| JP | 2002041755 A | 2/2002 |
| JP | 2003-61065 A | 2/2003 |
| JP | 2004362319 A | 12/2004 |
| JP | 6186068 B | 8/2017 |

OTHER PUBLICATIONS

Notice of Reasons for Refusal dated Oct. 9, 2018 in corresponding application No. 2017-226881, 5 pgs.

Decision to Grant a Patent dated Dec. 19, 2019 in corresponding application No. 2017-226881, 5 pgs.

First Office Action dated Jun. 28, 2021 in corresponding Chinese Application No. 201880066535.5; 18 pages.

Office Action dated Apr. 26, 2023, in corresponding Chinese Application No. 202210956290.1, 15 pages.

* cited by examiner

VIDEO DISTRIBUTION SERVER, VIDEO DISTRIBUTION METHOD AND RECORDING MEDIUM

CLAIM OF PRIORITY

The disclosure of the application claims priority and is related to the subject matter described in U.S. application Ser. No. 16/609,277, filed on Oct. 29, 2019, and Japanese Patent Application No. 2017-226881, filed on Nov. 27, 2017, the entire disclosure contents of which are hereby incorporated by reference.

FIELD

The present disclosure relates to a technology for distributing videos, and specifically, relates to a technology for providing interactive services in broadcasting.

BACKGROUND

In recent years, video distribution services that allow individuals to distribute videos through a network without a need of a specific equipment have been increasingly widespread. In such a video distribution service, a conventional art with a questionnaire function that an originator of live broadcasting can create a questionnaire instantly and obtain an answer from a viewer has been known.

Another conventional art with a service that can implement a questionnaire on a website has also been known.

Patent Document 1, Japanese Patent Publication No. 2013-222390, is noted.

SUMMARY

Originators who implement questionnaires in live broadcasting have a desire to collect opinions extensively including from people other than the viewers. People who cannot view the live broadcasting have a desire to participate in questionnaires implemented in the live broadcasting.

However, there has been an issue that only the viewers of the live broadcasting are allowed to respond to the questionnaires implemented in the live broadcasting in which the video distribution service is used.

In addition to questionnaires, there has also been an issue that only the viewers of the live broadcasting are allowed to participate in interactive events performed during the broadcasting, such as quizzes and game competitions performed in the broadcasting.

In view of the foregoing, the purpose of an embodiment is to enable people who are not viewing the broadcast to participate in events implemented during the broadcasting.

The video distribution device according to a first aspect of the embodiment comprises a distribution means of distributing a video to a viewer terminal based on an instruction from an originating terminal and an execution means of executing an interactive service to the viewer terminal and providing the interactive service to a server device when receiving a request to start the service from the originating terminal during the distribution of the video.

A video distribution method according to a second aspect of the embodiment is the video distribution method executed by a computer, comprising a step of distributing a video to a viewer terminal based on an instruction from an originating terminal and a step of executing an interactive service to the viewer terminal and providing the interactive service to a server device when receiving a request to start the service from the originating terminal during the distribution of the video.

A recording medium according to a third aspect of the embodiment is a computer-readable recording medium which records a program to direct a processor to execute a processing to distribute a video to a viewer terminal based on an instruction from an originating terminal and a processing to execute an interactive service to the viewer terminal and provide the interactive service to a server device when receiving a request to start the service from the originating terminal during the distribution of the video.

According to the embodiment, it is possible to enable people who are not viewing the broadcasting to participate in events implemented during the broadcasting.

DETAILED DESCRIPTION

Figure 1:
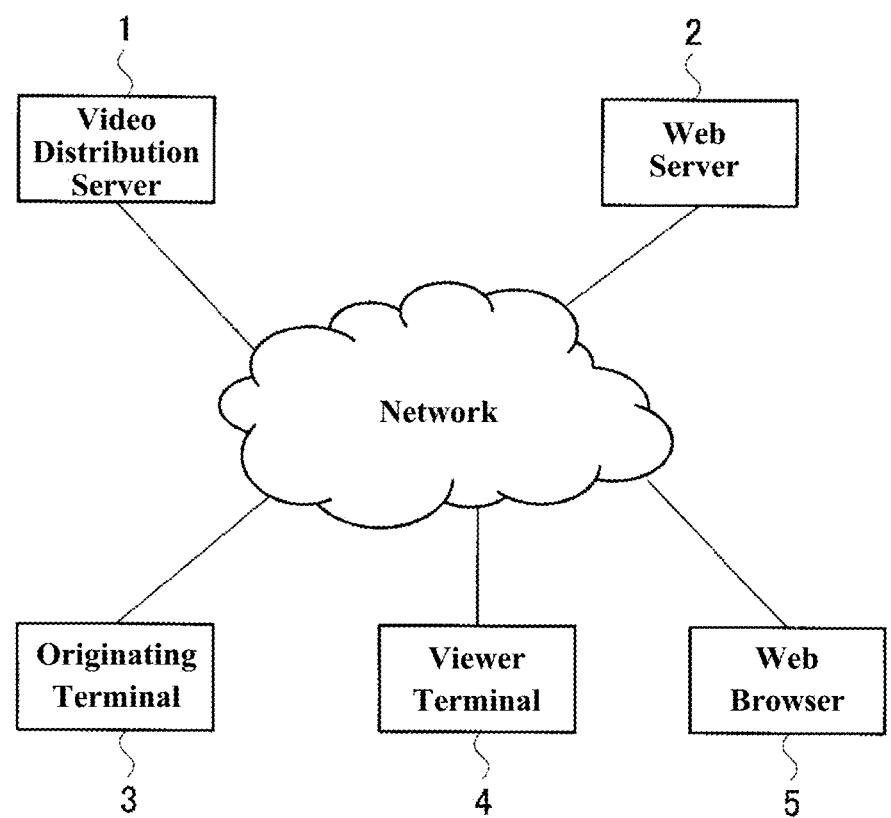
FIG. 1 is an overall configuration diagram showing a configuration example of a service connection system including a video distribution server of the embodiment.

Hereinafter, the embodiment will be described while referring to the drawings.

While referring to FIG. 1, an overall configuration of a service connection system including the video distribution server according to the embodiment will be described. The service connection system is a system connecting between broadcasting and the web and providing interactive services pertaining to both the broadcasting and the web. The service connection system shown in FIG. 1 includes the video distribution server 1 and a web server 2. The video distribution server 1 and the web server 2 are connected through a network. The originating terminal 3 and the viewer terminal 4 are connected to the video distribution server 1 through the network.

The originating terminal 3 is a terminal used by the originator to transmit broadcasting. The viewer terminal 4 is a terminal used by the viewer to view broadcasting. A personal computer or a mobile terminal such as a smartphone or a tablet may be used for the originating terminal 3 and the viewer terminal 4. The web browser 5 is connected to the web server 2 through the network. The web browser 5 is for viewing a webpage provided by the web server 2 and is executed by a personal computer, a mobile terminal or equivalent devices. In the embodiment herein, the web browser 5 is defined as a terminal used by a person who is neither the originator nor the viewer. Further, in FIG. 1, although the number of the originating terminal 3, the viewer terminal 4 and the web browser 5 are set to be one each respectively, these numbers are practically much higher.

The video distribution server 1 receives a video for broadcasting from the originating terminal 3 and distributes the video to the viewer terminal 4. The video for the broadcasting may be a video of a live broadcasting taken by a camera connected to the originating terminal 3 or a video recorded in advance, for example. Alternatively, it may be a still image in which audio is added. When distributing a video recorded in advance, the video distribution server 1 does not necessarily need to receive the video from the originating terminal 3 and may receive and distribute the video from a location designated by the originating terminal 3.

When receiving an instruction to implement a questionnaire from the originating terminal 3, the video distribution server 1 implements the questionnaire in the broadcasting and directs the web server 2 to implement the questionnaire with the same content. The viewer can use the viewer terminal 4 to answer the questionnaire. People who are not viewing the broadcasting on the viewer terminal 4 can answer the questionnaire with the same content as the questionnaire in the broadcasting by accessing to the web server 2 in the web browser 5.

The web server 2 provides a website with a questionnaire function. When the web browser 5 accesses the web server 2, it is possible to answer the questionnaire provided by the web server 2. When receiving the instruction to execute the questionnaire from the video distribution server 1, the web server 2 implements the questionnaire in the web server 2. The web server 2 transmits the result of the questionnaire implemented to the video distribution server 1 based on the instruction of the video distribution server 1. Further, since the web server 2 can implement the questionnaire independently from broadcasting, in addition to the viewers, unspecified large number of people are allowed to answer the questionnaire provided by the web server 2.

Figure 2:
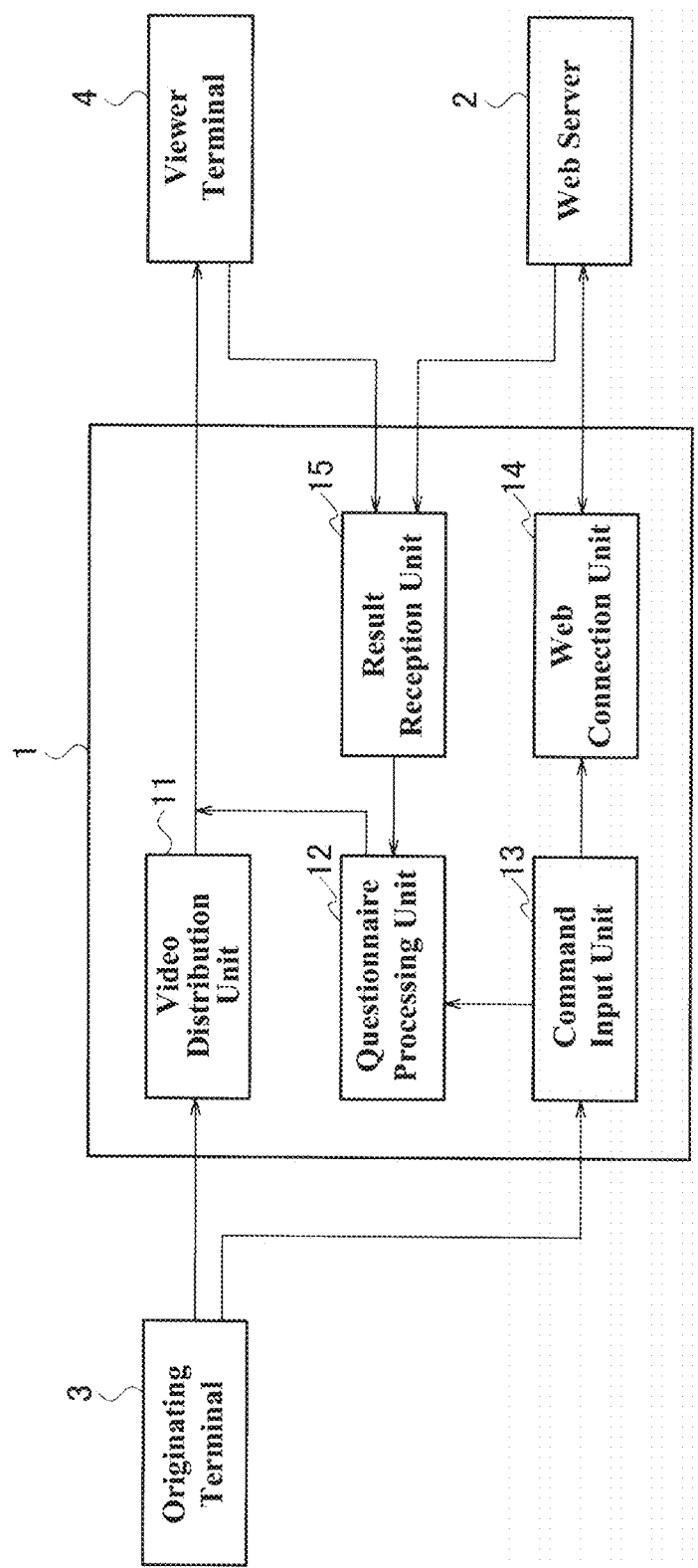
FIG. 2 is a functional block diagram showing a configuration example of the video distribution server.

Next, a configuration example of the video distribution server 1 will be described while referring to FIG. 2. The video distribution server 1 as shown in FIG. 2 includes a video distribution unit 11, a questionnaire processing unit 12, a command input unit 13, a web connection unit 14 and a result reception unit 15. Each unit provided in the video distribution server 1 may be configured by a computer with an arithmetic processing device, a recording device or equivalent devices, and processing of each unit may be executed by programming. The programing is stored in the recording device provided in the video distribution server 1, and it is possible to record in the recording medium such as a magnetic disk, an optical disk or a semiconductor memory and further, it is possible to provide through a network. Each unit will be described as below.

The video distribution unit 11 receives a video from the originating terminal 3 and distributes the video to the viewer terminal 4.

The questionnaire processing unit 12 implements the questionnaire in the broadcasting based on an instruction from the originating terminal 3. Specifically, the questionnaire processing unit 12 displays the questions and answer options on the viewer terminal 4 by superimposing the questions and answer options of the questionnaire on the video distributed by the video distribution unit 11 and receives the information on the option selected by the viewer. The questionnaire processing unit 12 receives the questionnaire result in the broadcasting and the questionnaire result on the web from the result reception unit 15 and reports the questionnaire result in the broadcasting. The questionnaire results may be displayed on the viewer terminal 4 by superimposing the result on the video.

The command input unit 13 receives an input of a command from the originator and performs processing according to the input command. The examples of commands related to the embodiment include a command for implementing a questionnaire, a command for ending a questionnaire and a command for displaying a questionnaire result. The command input unit 13 controls the questionnaire, processing unit 12 to implement the questionnaire in the broadcasting and controls the web connection unit 14 to implement the questionnaire on the web server 2 when receiving the command to implement the questionnaire.

The web connection unit 14 connects the broadcast and the webpage. Specifically, when the questionnaire is implemented in the broadcasting, the web connection unit 14 transmits the questions and the answer options of the questionnaire implemented in the broadcasting to the web server 2 and directs the web server 2 to implement the same questionnaire.

The result reception unit 15 receives each of the questionnaire result in the broadcasting and the questionnaire result on the web respectively. The result reception unit 15 may combine each questionnaire result.

Figure 3:
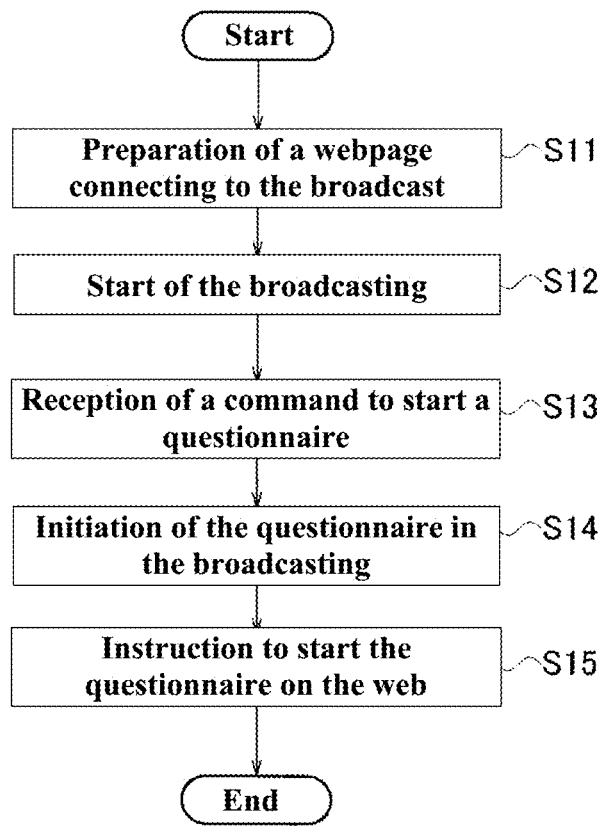
FIG. 3 is a flowchart showing the flow of the processing in which the video distribution server connects with a web server and implements a questionnaire.

Next, a processing in which the video distribution server 1 connects with the web server 2 and implements a questionnaire will be described while referring to FIG. 3.

First, as advance preparation, the video distribution server 1 directs the web server 2 to prepare a webpage connecting to the broadcast based on the instruction of the originator (Step S11). The video distribution server 1 generates a program ID for identifying the program with respect to each program, which is a unit of a set of broadcasting. The video distribution server 1 transmits the program ID to the web server 2 and directs the web server 2 to prepare a webpage connected to the program ID when receiving the request for connecting the broadcast and the web from the originating terminal 3. The webpage prepared by the web server 2 may be empty or may display that the questionnaire has not been implemented yet. Alternatively, an introduction of the corresponding program may be described, or a link to a page introducing the corresponding program may be posted. Further, a user ID identifying an originator may be used as an identifier which links the broadcast and the webpage.

The video distribution server 1 receives the Uniform Resource Identifier (URI) of the webpage prepared in the web server 2. By displaying, the URI on, for example, the announcement page of the program, the originator can lead a person who cannot view the program at the time of broadcasting to the webpage corresponding to the program. In addition, when the web server 2 provides an interface in accordance with the design principle of Representational State Transfer (REST), the URI may be used to perform acquisition, creation, correction and deletion of the information.

The originator may connect the program and the web by using the management screen provided by the video distribution server 1 or may connect, the program and the web by using the management screen provided by the web server 2. When the program and the web are connected from the web server 2 side, the URI of the webpage prepared by the web server 2 and the program ID (which may be a user ID) are transmitted to the video distribution server 1.

The video distribution server 1 records that the program and the web are connected and stores the information necessary for the connection (for example, the URI of the webpage).

Further, the connection between the program and the web may be performed during the broadcasting of the program.

The video distribution server 1 receives an instruction to start broadcasting from the originating terminal 3 and starts the broadcasting (Step S12). After the initiation of the broadcasting, the video distribution server 1 receives the video from the originating terminal 3 and distributes the video to the viewer terminal 4. The video distribution server 1 may receive a comment from the viewer terminal 4 during the broadcasting and display the comment on the originating terminal 3 and other viewer terminals 4. The comment processing may be a comment distribution server different from the video distribution server 1.

When receiving the command to start the questionnaire from the originating terminal 3 (Step S13), the video distribution server 1 starts the questionnaire in the broadcasting (Step S14). The originator operates the originating terminal 3 and transmits the contents of the questionnaire such as questions and answer options to the video distribution server 1 when implementing the questionnaire during the broadcasting. The video distribution server 1 transmits the questions and the answer options received from the originator to the viewer terminal 4, and the viewer terminal 4 creates and displays a questionnaire implementation screen using the received questions and the answer options. The video distribution server 1 may create the questionnaire implementation screen and transmit it to the viewer terminal 4.

Figure 4:
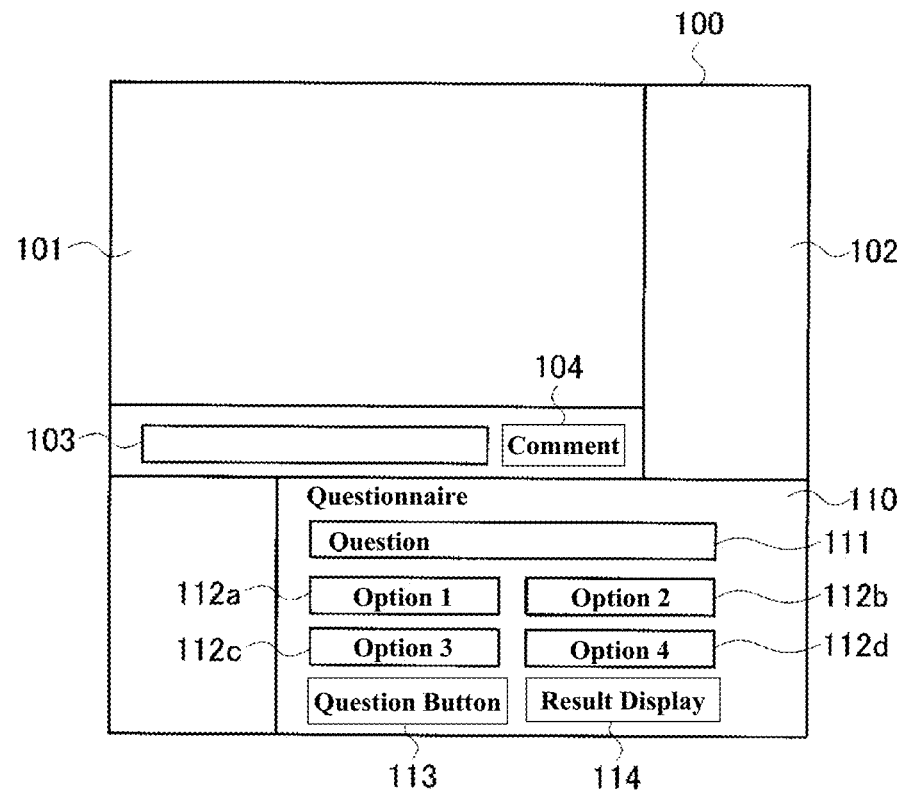
FIG. 4 is a diagram showing an example of a display screen displayed on an originating terminal when broadcasting a program.

An example of a display screen displayed on the originating terminal 3 is shown in FIG. 4. In the video section 101 of the display screen 100, the video in the broadcasting and comments input with respect to the broadcasting are superimposed and displayed. The video displayed in the video section 101 and the comment are the same as the video displayed on the viewer terminal 4. In the comment list section 102 on the right side of the video section 101, a list of comments input with respect to the broadcasting is displayed. The comment input field 103 on the lower side of the video section 101 is used by the originator to input a comment. When the originator inputs a comment in the comment input field 103 and clicks on the comment posting button 104, the input comment is posted and displayed during the broadcasting.

The questionnaire section 110 on the lower part of the display screen 100 is an area for inputting the information of the questionnaire. A question is entered in the question input field 111. Answer options with respect to the question are entered in the answer options input fields 112*a* to 112*d*.

When the originator inputs the question and the answer options in the question input field 111 and the answer options input fields 112*a* to 112*d* and clicks on the question button 113, the command to start the questionnaire requesting the implementation of the questionnaire is transmitted to the video distribution server 1 along with the contents of the questionnaire. When the originator clicks on the result display button 114, the collected result of the questionnaire is displayed.

In addition, the questionnaire may also be started by inputting a command in the comment input field 103. When inputting "/" followed by a predetermined character string in the comment input field 103, the input character string is interpreted as a command. For example, when the originator inputs "/vote start a question answer option 1 answer option 2 answer option 3 answer option 4" in the comment input field 103 and clicks on the comment posting button 104, the command to start the questionnaire is transmitted to the video distribution server 1 along with the question and answer options 1 to 4.

Figure 5:
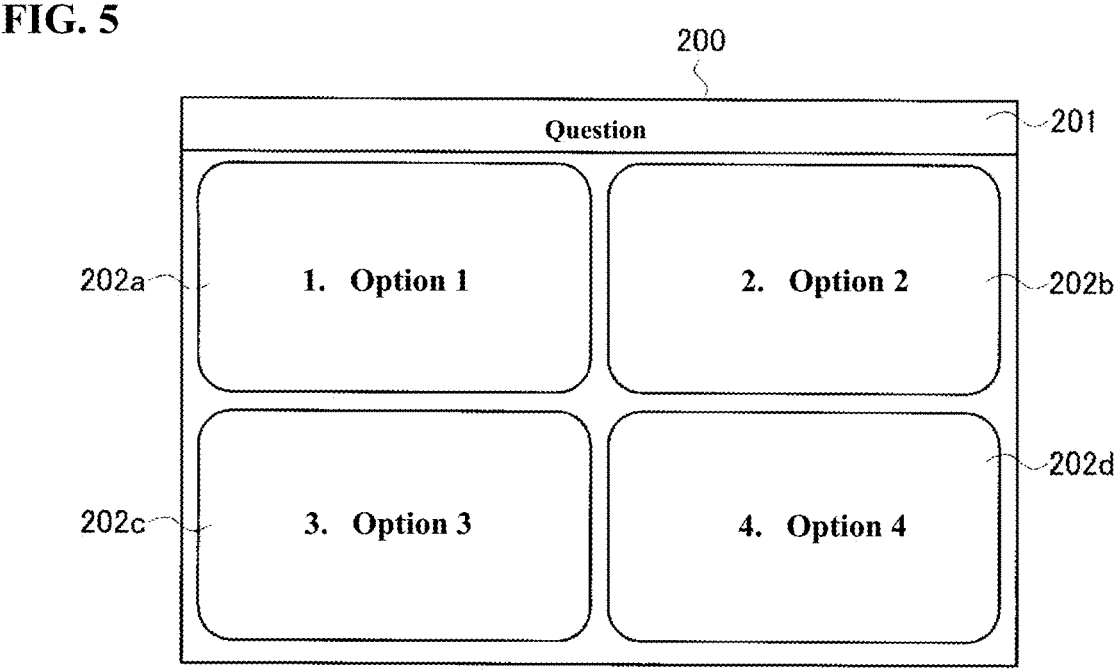
FIG. 5 is a diagram showing an example of a questionnaire implementation screen displayed on a viewer terminal.

An example of the questionnaire implementation screen displayed on the viewer terminal 4 is shown in FIG. 5. The question 201 of the questionnaire is displayed on the top of the display screen 200. Answer option buttons 202*a* to 202*d* displaying the contents of each option are displayed below the question 201. The question 201 and the answer option buttons 202*a* to 202*d* may be superimposed and displayed on the distributed video.

The viewer can answer the questionnaire by selecting one of the displayed answer option buttons 202*a* to 202*d* with tapping the screen or using a pointing device such as a mouse. The questionnaire, may be answered by inputting the number given to the answer options.

Referring back to FIG. 3, the video distribution server 1 instructs the web server 2 to implement the questionnaire with the same content when connecting the broadcast and the web (Step S15). The video distribution server 1 transmits the question and the answer options received from the originating terminal 3 to the web server 2 and implements the questionnaire on the webpage connected to the broadcast.

The web server 2 rewrites the content of the webpage or creates a webpage using the received questions and answer options.

Figure 6:
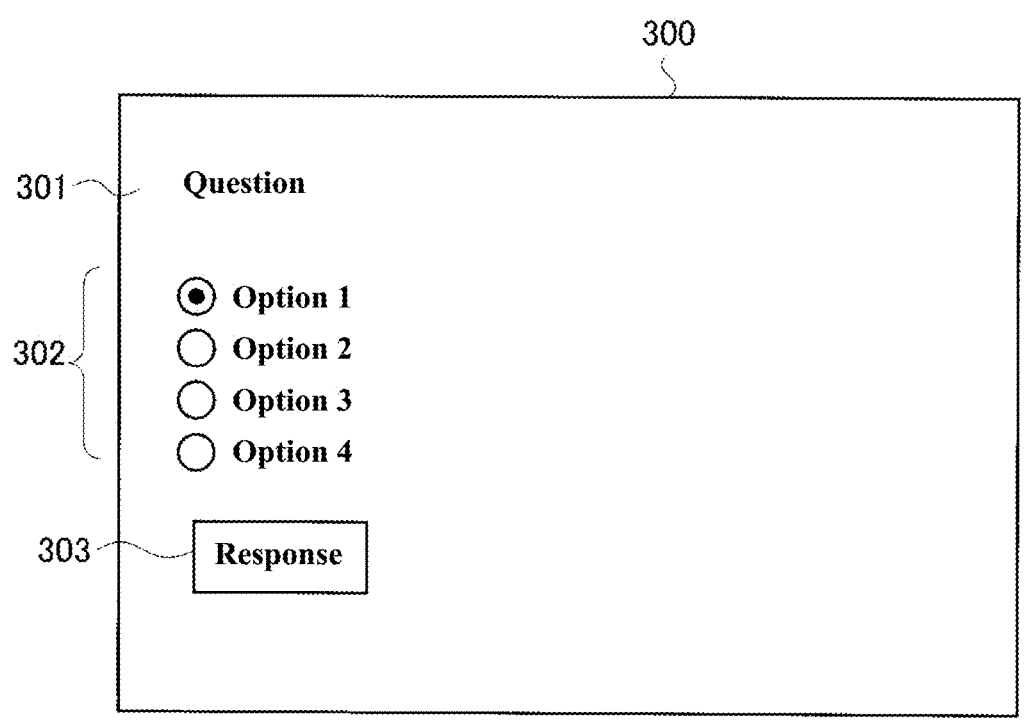
FIG. 6 is a diagram showing an example of the questionnaire implementation screen on a webpage.

When the web browser 5 accesses the webpage connected to the broadcast, the webpage 300 as shown in FIG. 6 is displayed. The question 301 and answer options 302 which are the same as the questionnaire implemented in the broadcasting are displayed on the webpage 300 in the example of FIG. 6, the viewers of the webpage can answer the questionnaire by selecting one of the answer options 302 with the radio button placed on the left side of the answer options 302 and clicking on the response button 303.

Figure 7:
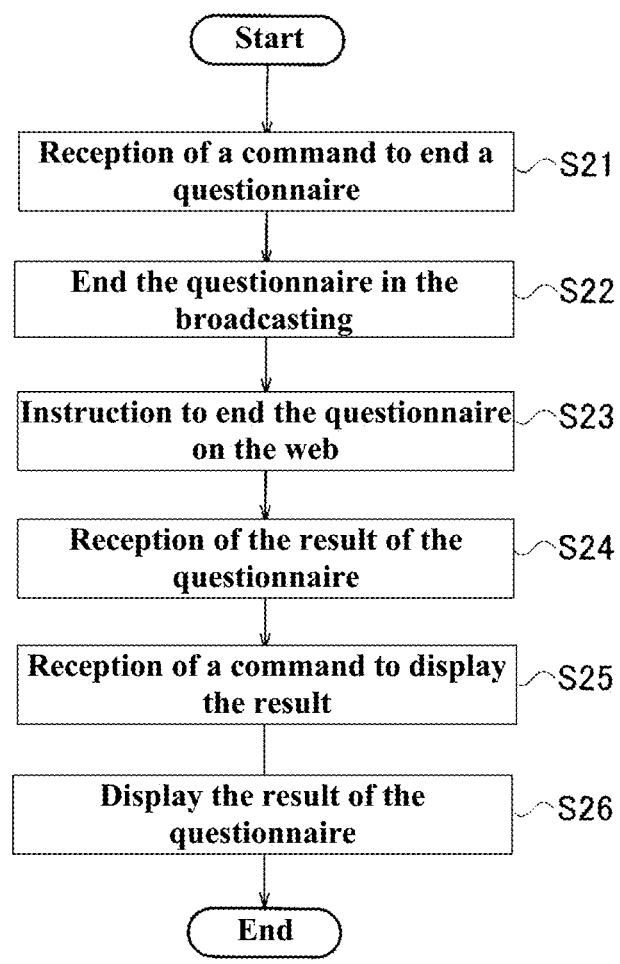
FIG. 7 is a flowchart showing the flow of the processing which completes the questionnaire and displays a result.

Next, a process of ending the questionnaire and displaying the result will be described while referring to FIG. 7.

When receiving the command to end the questionnaire from the originating terminal 3 (Step S21), the video distribution server 1 ends the questionnaire in the broadcasting (Step S22). The originator operates the originating terminal 3 and transmits to the video distribution server 1 that the questionnaire will be ended. The video distribution server 1 notifies the viewer terminal 4 that the questionnaire has ended. The viewer terminal 4 stops the display of the questionnaire implementation screen when receiving the notification of the completion of the questionnaire.

When ending the questionnaire in the broadcasting, the video distribution server 1 also instructs the web server 2 to end the questionnaire (Step S23).

The web server 2 deletes or disables the response button 303 of the webpage 300 when receiving the notification of the end of the questionnaire from the video distribution server 1. Alternatively, the web server 2 may turn the webpage 300 to a blank state.

When the questionnaire on the web server 2 is completed the video distribution server 1 receives the result of the questionnaire from the web server 2 (Step S24). The result of the questionnaire received by the video distribution server 1 may be the number of people or the percentages of people who selected each option, for example. Further, even before the completion of the questionnaire, the video distribution server 1 may receive the intermediate result during the implementation of the questionnaire from the web server 2 at any time.

The video distribution server 1 may combine the result of the questionnaire in the broadcasting and the result of the questionnaire on the web when receiving the result of the questionnaire from the web server 2.

When receiving the command to display the result from the originating terminal 3 (Step S25), the video distribution server 1 directs the viewer terminal 4 to display the result of the questionnaire (Step S26). The originator operates the originating terminal 3 and transmits the command to display the result to the video distribution server 1. The video distribution server 1 transmits the result of the questionnaire to the viewer terminal 4, and the viewer terminal 4 creates and displays the questionnaire result screen on which the result of the questionnaire is displayed.

Figure 8:
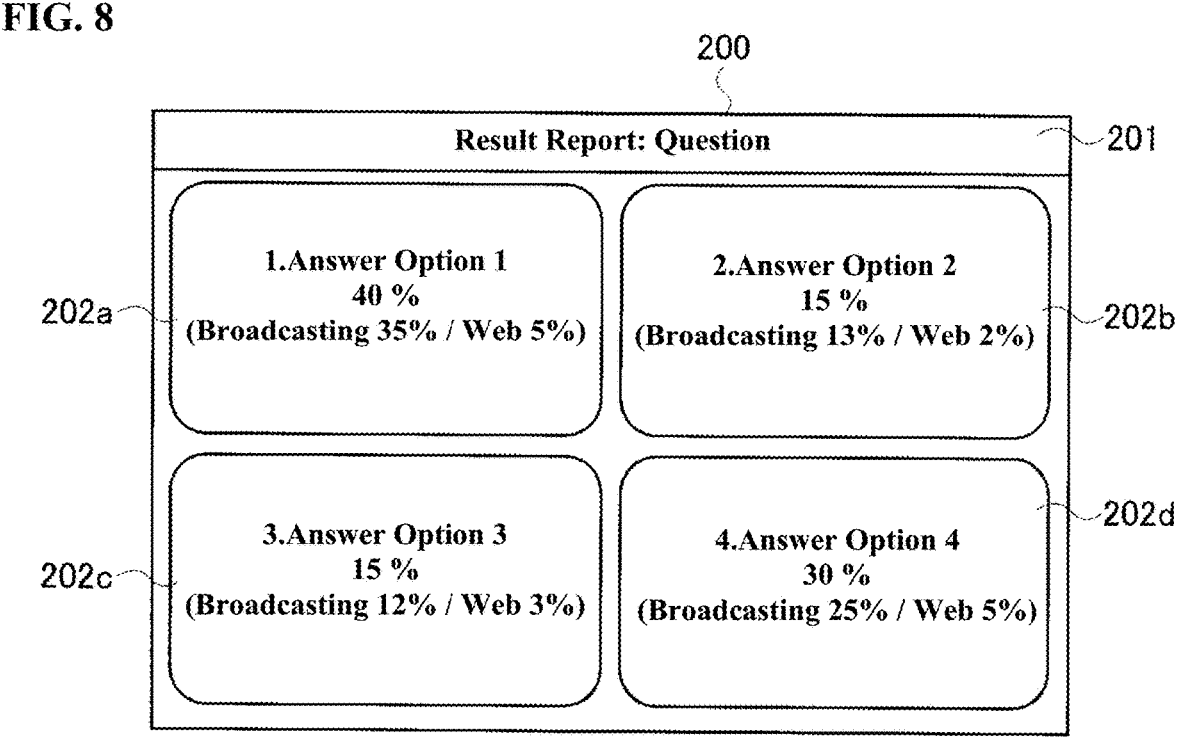
FIG. 8 is a diagram showing an example of the display screen of the questionnaire result displayed on the viewer terminal.

In the display screen 200 of the questionnaire result shown in FIG. 8, the question 201 is displayed on the top of the page, and answer option buttons 202a to 202d are displayed below the question 201 in which the content of each option and the percentages of the selections are displayed. In the example of FIG. 8, the results of the questionnaire in the broadcasting and the questionnaire on the web are summarized and displayed. The viewer terminal 4 may display only the result of the questionnaire in the broadcasting or only the result of the questionnaire on the web.

The video distribution server 1 may instruct the web server 2 to also display the result of the questionnaire when the result of the questionnaire is displayed in the broadcasting. The video distribution server 1 combines the result of the questionnaire in the broadcasting and the result of the questionnaire on the web and transmits the summarized result of the questionnaire to the web server 2. The web server 2 displays the received result of the questionnaire on the webpage connected to the broadcast. The video distribution server 1 may transmit only the result of the questionnaire in the broadcasting, and the web server 2 may combine the result of the questionnaire in the broadcasting and the result of the questionnaire on the web.

Figure 9:
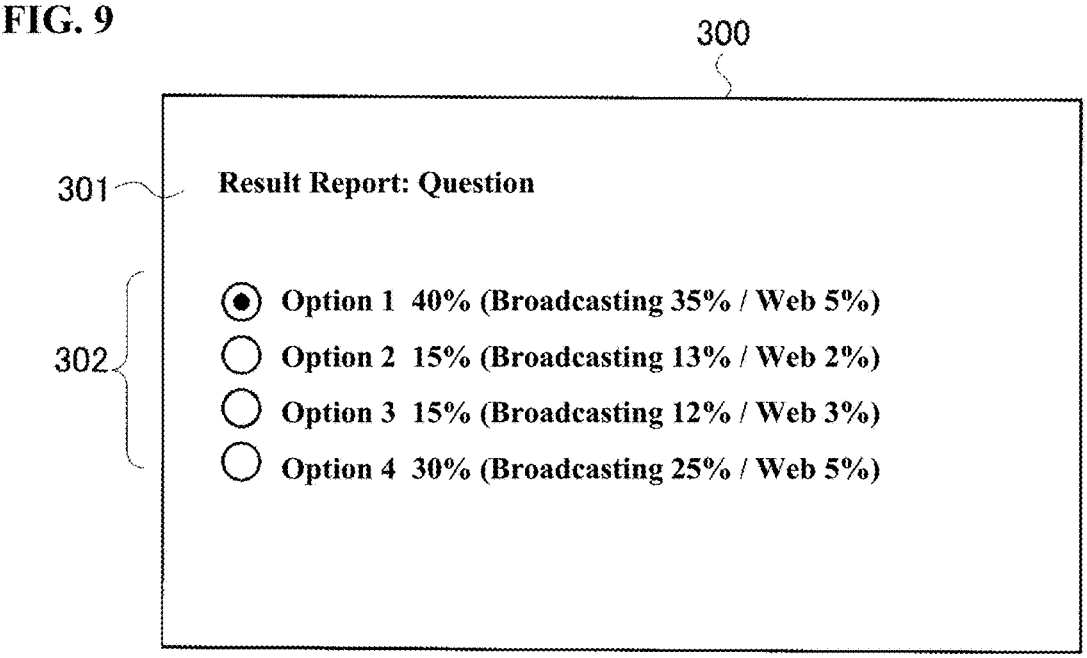
FIG. 9 is a diagram showing an example of the questionnaire result screen on the webpage.

On the webpage 300 displaying the result of the questionnaire shown in FIG. 9, the question 301 and the answer options 302 describing the result of the questionnaire in the broadcasting and on the web are displayed. If the viewer of the webpage has answered the questionnaire, the answer option 302 selected by the radio button is shown.

Thereafter, when the originator sets a new questionnaire in the broadcasting, the new questionnaire is implemented in the broadcasting, and the questionnaire of the webpage connected to the broadcasting is converted to the new questionnaire on the web server 2.

(Examples of Modification)

Hereinafter, examples of some modifications of the embodiment will be described.

In the preceding examples, the question and the answer options of the questionnaire are transmitted from the video distribution server 1 to the web server 2, however, the video distribution server 1 may receive the question and the answer options of the questionnaire from the web server 2.

The originator records the question and the answer options of the questionnaire in the web server 2 in advance. Multiple questionnaires may be recorded in the web server 2. The questionnaire recorded in the web server 2 may be set so as not to be displayed on the webpage until the video distribution server 1 gives an instruction.

Suppose that a program starts and the video distribution server 1 receives a command to start a questionnaire. If an instruction to implement the questionnaire recorded in the web server 2 is included in the command to start the questionnaire, the video distribution server 1 instructs the web server 2 to implement the recorded questionnaire, receives the recorded questions and answer options of questionnaire from the web server 2 and starts the questionnaire in the broadcasting. If multiple questionnaires are recorded in the web server 2, the questionnaire to be implemented is specified in the command to start the questionnaire.

The web server 2 starts the questionnaire on the webpage connected to the broadcast.

The web server 2 may implement the questionnaire recorded in advance before the start of the program. After starting the program, the web server 2 implements the questionnaire according to the instruction of the video distribution server 1.

The web server 2 may continue to implement the questionnaire even after the end of the program. The web server 2 records the question and the answer options transmitted from the video distribution server 1. After the end of the program, the web server 2 continues to implement the questionnaire using the recorded questions and answer options according to the instruction from the video distribution server 1. The result of the questionnaire can be obtained later in the program.

The originator may apply a questionnaire prepared by a third party. Specifically, when implementing the questionnaire during the broadcasting, the originator specifies the webpage of the questionnaire to be applied and obtains the question and answer options of the questionnaire. At this time, the results of the questionnaire on the webpage may be obtained simultaneously. The result of the questionnaire in the program may be reflected on the webpage of the original source. However, in this case, a permission to update the results of the questionnaire on the webpage is required. For example, the creator of the questionnaire may set so that anyone can update the result of the questionnaire on the webpage.

In addition, multiple originators may share the webpage connecting to the broadcast. The main originator can control the webpage connecting to the broadcast. That is, the questionnaire is implemented in the broadcasting and on the web according to the timing of the main originator. Although other originators cannot control the main originator's webpage, they can obtain the questions and the answer options from the webpage connecting to the main originator's broadcast in their own program. When the main originator implements the questionnaire in the broadcasting and on the web, in the programs of other originators, the questions and the answer options of the questionnaire can be received from the web server 2, and the questionnaire with the same contents can be implemented in their own programs.

When sharing the webpage connecting to the broadcast, any one of multiple originators may be able to control the webpage. In this case, multiple originators can take turns and set a questionnaire.

Further, the response style of the questionnaire may be, in addition to select an answer option, by inputting characters freely to respond, drawing a picture to respond or capturing an image to respond.

Furthermore, the interactive services provided by connecting the broadcast and the web is not limited to the questionnaire and may be a quiz or a game that can be performed by the viewer terminal 4 and the web browser 5. When providing a game, the video distribution server 1 may receive the game scores from the web server 2 and summarize them.

(Shopping Program)

Next, an example in which the video distribution server of the embodiment is applied to a shopping program will be described.

In recent years, there has been an extensive popularization for commodities trading between individuals through a network. Sales promotion can be expected by introducing the products sold by individuals in their own programs. Further, the prospective purchaser (the viewer of the program) has an advantage of being able to directly ask a question to the seller (the originator of the program) about the product in the program.

By applying the service connection system to the shopping program, connecting the program to the web and introducing the products introduced in the program on the website at the same time, it is possible even for people who cannot view the program to learn about the products introduced in the program by accessing the webpage.

Hereinafter, a comment function, a cart function and an auction function will be described as examples of interactive services that connect shopping programs and the web.

First, an example of the comment function provided by both the program and the web in which the program and the web are connected will be described while referring to FIGS. 10 and 11.

Figure 10:
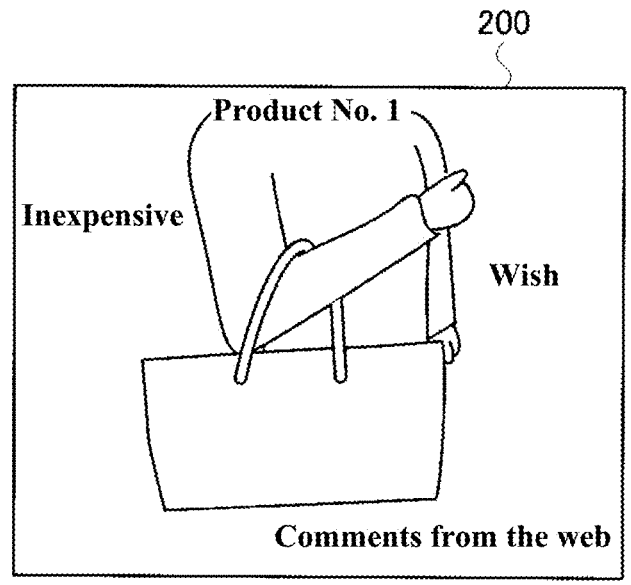
FIG. 10 is an example diagram of the display screen of a shopping program displayed on the viewer terminal.

In the image of the program shown in FIG. 10, the comments input on the webpage connecting to the program are also superimposed in addition to the comments input by the viewers. The information on the product currently being introduced is shown on the top of the display screen 200 as "Product No. 1" in FIG. 10. The comment input to the webpage is shown on the bottom of the display screen 200 as "Comments from the web." Other comments are the comments input by the viewers.

Figure 11:
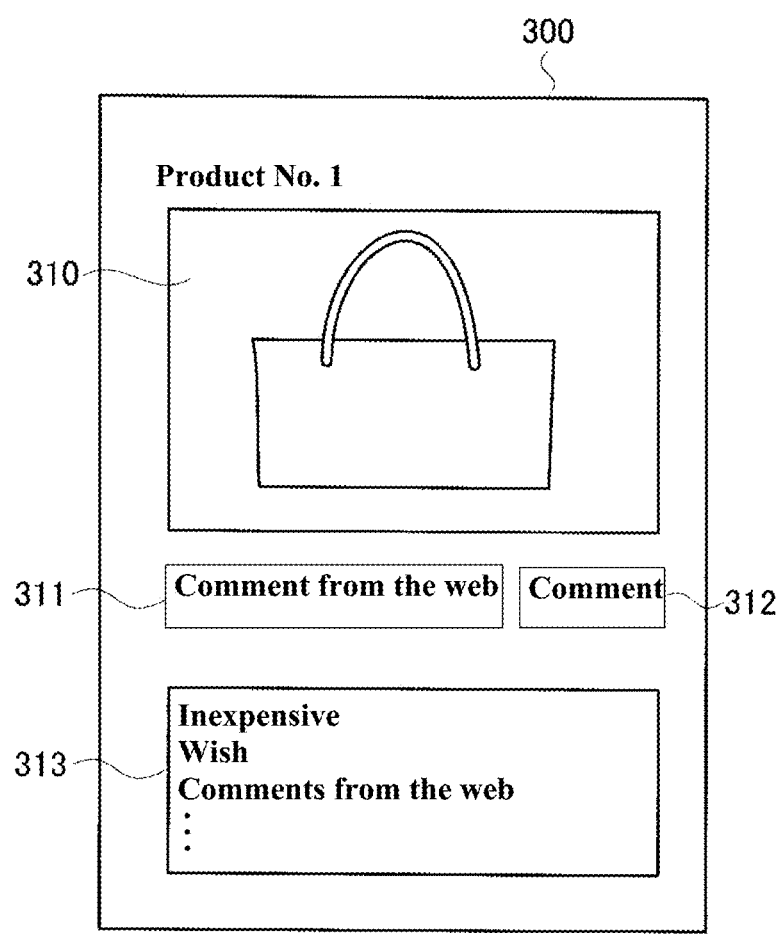
FIG. 11 is an example diagram of the webpage connecting with the shopping program of FIG. 10.

The webpage 300 in FIG. 11 is configured with a product image 310, a comment input field 311, a comment post button 312 and a comment display field 313. The product image 310 is an image of the product being introduced in the program. The image may be recorded in advance in the web server 2 or may be a screen shot of the program. When the product introduced in the shopping program has changed, the product image 310 will be also changed. The program controls the timing at which the product image 310 displayed on the webpage is changed. Comments input by the viewers of the webpage 300 are displayed in the comment input field 311. The comment input by the program viewer may be additionally displayed.

A flow of the processing in which the video distribution server 1 and the web server 2 are connected in the shopping program will be described while referring to FIG. 12.

As advance preparation, the video distribution server 1 directs the web server 2 to prepare a webpage connecting to the shopping program (Step S31). The originator may record the product information, such as an image of the product to be introduced, in the web server 2 in advance.

The video distribution server 1 starts broadcasting of the shopping program (Step S32).

When receiving the command to start the product introduction from the originating terminal 3 (Step S33), the video distribution server 1 determines that the product introduction has been started for the program (Step S34). Alternatively, when receiving a command to display the sub screen or receiving a command to display a still image from the originating terminal 3, or a comment is input to be displayed by fixing on the screen, the video distribution server 1 may determine to start the product introduction. The viewer can identify the product being introduced by the originator presenting a video of the product on the sub screen, showing the product introducing as a still image, and displaying the product name of the introduced product on the screen.

When the product introduction in the program is started, the video distribution server 1 instructs the web server 2 to start the product introduction (Step S35). The web server 2 displays the product information on the webpage when receiving the instruction, and then, enables the comment function. In the following examples, the web server 2 enables the cart function and the auction function.

The comment input by the viewer of the program is transmitted from the viewer terminal 4 to the video distribution server 1. The video distribution server 1 superimposes the received comment on the image of the program and transmits the comment to the web server 2. The web server 2 displays the received comment on the comment display field 313.

In addition, when the viewer of the webpage 300 inputs the comment in the comment input field 311 and clicks on the comment post button 312, the web server 2 displays the input comment in the comment display field 313 and transmits the comment to the video distribution server 1. The video distribution server 1 superimposes the received comment on the image of the program.

As described, the comments input in each of the program and the web are mutually reflected each other. People who cannot view the program are also allowed to make a comment on the products introduced in the program. For example, the comment field can be used to inquire about the product or to negotiate a price reduction.

When the product introduced in the program has been changed, the product image 310 of the webpage 300 is changed. Specifically, the video distribution server 1 instructs the web server 2 to change the product when receiving a command to change the product from the originating terminal 3, and the web server 2 changes the product image 310 to the image of the next product. The video distribution server 1 may determine that the product to be introduced is changed when receiving a command to display the sub screen or receiving a command to display a new still image, or a new comment is input to be displayed by fixing on the screen.

Figure 13:
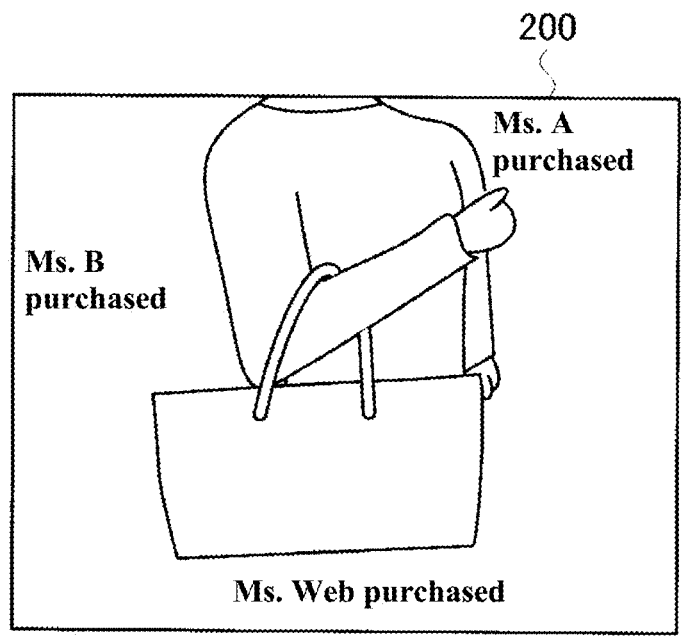
FIG. 13 is an example diagram of another display screen of the shopping program displayed on the viewer terminal.

Consequently, an example of the cart function provided by the program and the web in which the program and the web are connected will be described while referring to FIGS. 13 and 14.

The video distribution server 1 receives an order of a product from the viewer terminal 4. For example, when the viewer inputs a purchase command (for example, "/buy") in the comment input field, the order of the product may be transmitted. Alternatively, a selectable purchase button may be displayed on the display screen 200 of the viewer terminal 4 and when the viewer clicks on the purchase button, the order of the product may be transmitted from the viewer terminal 4 to the video distribution server 1. As in the image of the program shown in FIG. 13, the fact that the product has been ordered may be superimposed on the image of the program. The viewer can recognize the sales of the product from the amount of the purchase comments displayed on the display screen 200.

Figure 14:
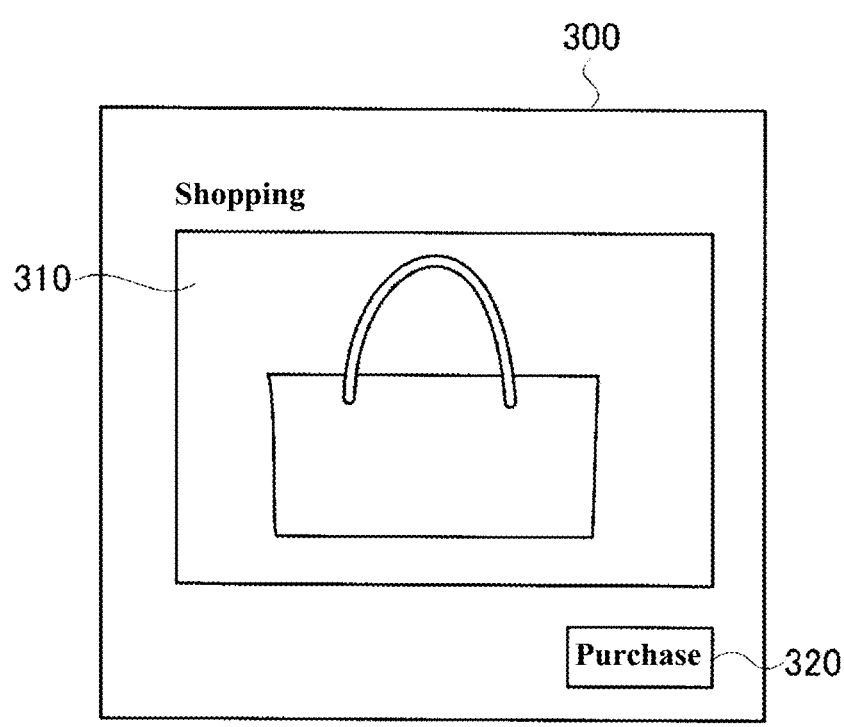
FIG. 14 is an example diagram of the webpage connecting with the shopping program of FIG. 13.
Figure 15:
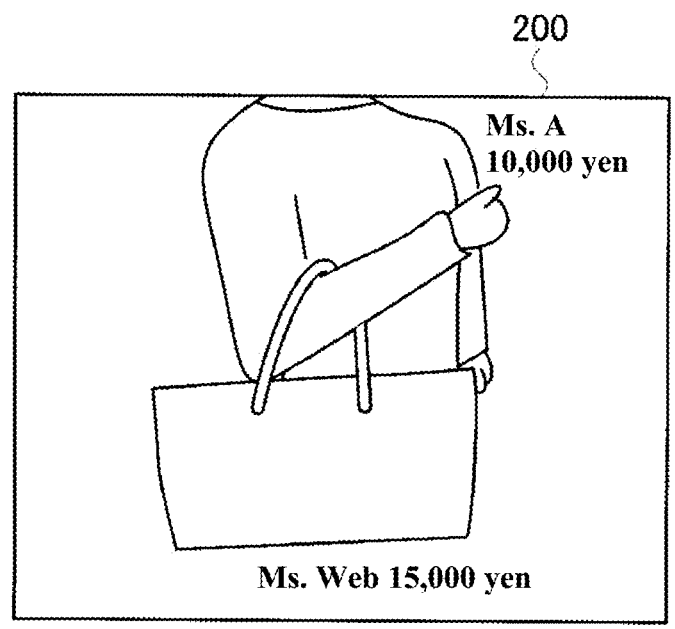
FIG. 15 is an example diagram of yet another display screen of the shopping program displayed on the viewer terminal.

The webpage 300 shown in FIG. 14 is configured with a product image 310 and a purchase button 320. The product image 310 is an image of the product being introduced in the shopping program. The viewer of the webpage 300 can order the product by clicking on the purchase button 320. The web server 2 transmits to the video distribution server 1 that the product has been ordered through the web. The video distribution server 1 may superimpose on the image of the program that the product has been ordered on the web when notified that the order has been accepted in the web server 2.

Next, an example of the auction function provided by the program and the web in which the program and the web are connected will be described while referring to FIGS. 13 and 16.

Figure 16:
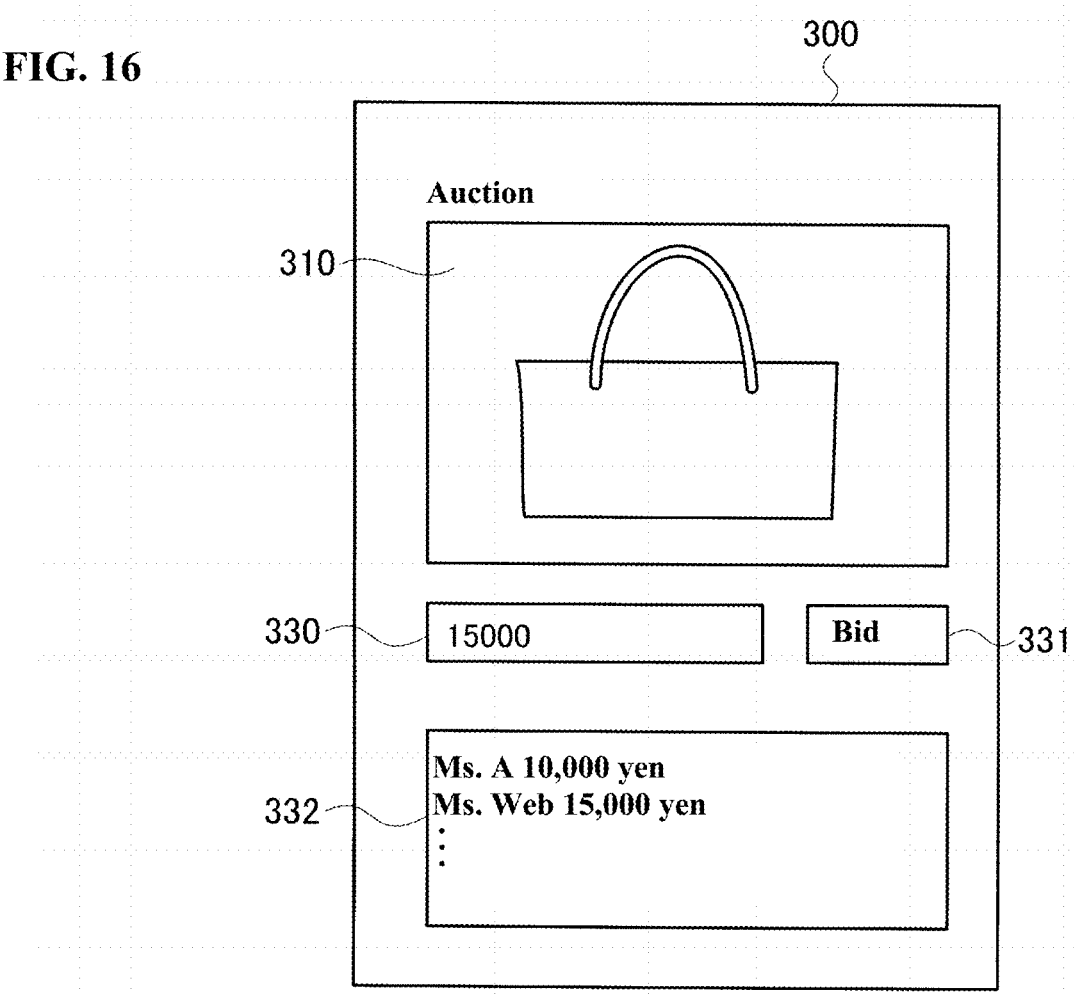
FIG. 16 is an example diagram of the webpage connecting with the shopping program of FIG. 15.

FIG. 1 is an example of a display screen of the viewer terminal 4, and FIG. 16 is an example of a webpage.

The video distribution server 1 receives a bid from the viewer terminal 4. When the viewer inputs a bid command and a bid price in the comment input field, the bid information is transmitted from the viewer terminal 4 to the video distribution server 1. When the bid price is updated, the video distribution server 1 superimposes the highest bid price on the image of the program and transmits the information of the highest bid price to the web server 2.

The webpage 300 shown in FIG. 16 is configured with a product image 310, a price input field 330, a bid button 331 and a bid information display field 332. The product image 310 is an image of the product subjected to a bid. The viewer of the webpage 300 can enter a bid price into the price input field 330 and can bid by clicking on the bid button 331. The web server 2 transmits the bid information such as the bid price to the video distribution server 1. The video distribution server 1 superimposes the highest bid price on the image of the program when the bid price is updated by a bid from the web. Further, the web server 2 displays the information on the bid information display field 332 when receiving the information on the highest bid price from the video distribution server 1.

Figure 12:
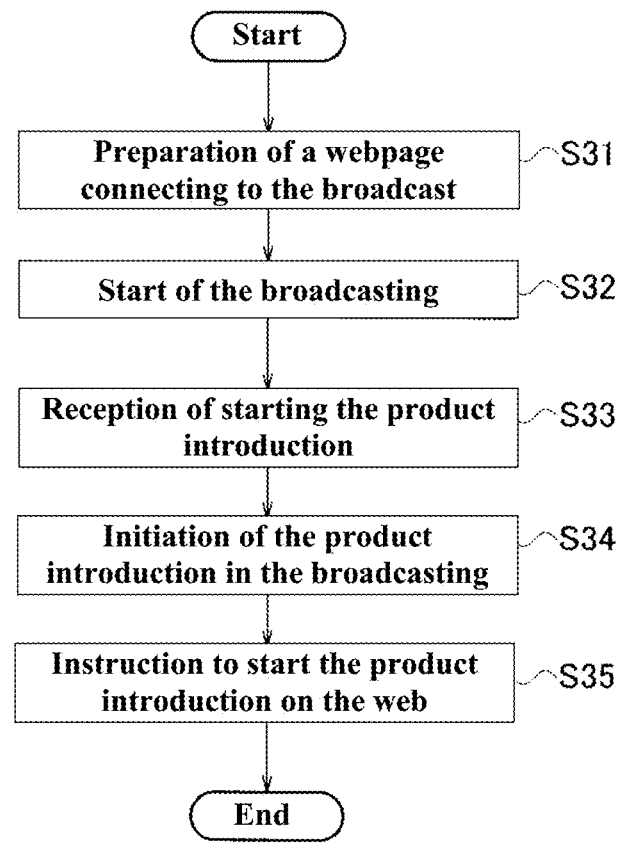
FIG. 12 is a flowchart showing the flow of the processing in which the video distribution server and the web server connect in the shopping program.

The comment function shown in FIG. 12 may be provided to the webpage 300 shown in FIGS. 14 and 16.

According to the embodiment as described above, by the video distribution server 1 receiving a video from the originating terminal 3 and distributing the video to the viewer terminal 4 implements a questionnaire in the broadcasting and directs the web server 2 to provide the same questionnaire based on an instruction from the originating terminal 3, people who cannot view the broadcast at the time of the questionnaire implementation in the broadcasting will be able to respond to the questionnaire on the web provided by connecting to the broadcast and therefore will be allowed to participate in the questionnaire in the broadcasting. In addition, by connecting the broadcast and the web and through the broadcast related to the questionnaire, it is possible to recognize the intentions and background of the questioner that would not be generally noticed only by looking at the question of the questionnaire on the web, which results in the motivation to answer the questionnaire for people who are not usually willing to participate in the questionnaire on the web.

The invention claimed is:

1. A video distribution method configured to be executed by at least one computer, comprising:
    receiving an instruction from an originating terminal to distribute a first video provided by the originating terminal;
    distributing a second video, which corresponds to the first video, from a distribution server to at least one viewer terminal based on the instruction from the originating terminal;
    receiving a start request, from the originating terminal, to start a questionnaire during transmission of the first video from the originating terminal to the distribution server;
    providing the questionnaire to a web server device from the distribution server when receiving the start request from the originating terminal and during the distribution of the second video;
    executing the questionnaire through the web server to at least one viewer;
    receiving a results request, from the originating terminal, to display results of the questionnaire;
    displaying the results of the questionnaire on the viewer terminal;
    storing the questionnaire; and
    reproducing the questionnaire as stored after terminating distribution of the second video.

2. The method according to claim 1, further comprising:
    transmitting a termination request to terminate execution of the questionnaire from the originating terminal to the distribution server.

3. The method according to claim 2, wherein the results may be displayed even after transmission of the termination request.

4. The method according to claim 2, wherein answers received after the termination request is transmitted are not included in the results of the questionnaire.

5. The method according to claim 1, wherein the questionnaire comprises a question text and a plurality of options.

6. The method according to claim 1, wherein the results are superimposed and displayed over the first video.

7. The method according to claim 1, wherein the first video comprises a live broadcast video captured by a camera.

8. An originator terminal device comprising at least a processor and storage, which serves as the originating terminal in the method of claim 1.

9. A viewer terminal device comprising at least a processor and storage, which serves as the viewer terminal in the method of claim 1.

10. A video distribution server which is configured to:
    receive an instruction from an originating terminal to distribute a first video and configured to distribute a second video, which corresponds to the first video, to at least one viewer terminal based on the instruction from the originating terminal;

receive a start request, from the originating terminal, to start a questionnaire during transmission of the first video from the originating terminal to the video distribution server;

provide the questionnaire to the at least one viewer terminal via a web server device;

receive at least one result of the questionnaire provided by a viewer of the video; and receive a results request, from the originating terminal, to display the at least one result of the questionnaire;

wherein, in response to the results request, the video distribution server facilitates display of the at least one result of the questionnaire on the viewer terminal, and wherein the questionnaire is stored and subsequently reproducible as stored after termination of distribution of the second video.

11. The video distribution server according to claim 10, wherein the video distribution server is further configured to receive a termination request to terminate execution of the questionnaire from the originating terminal.

12. The video distribution according to claim 11, wherein responses to the questionnaire are no longer accepted after the termination request is received.

13. The video distribution server according to claim 10, wherein the questionnaire comprises a question text and a plurality of options.

14. The video distribution server according to claim 10, wherein the at least one result is superimposed over the first video and transmitted as the second video.

15. The video distribution server according to claim 10, wherein the first video comprises a live broadcast video captured by a camera.

16. An originating terminal comprising a processor which is configured to:

transmit to a distribution server an instruction to distribute a first video provided by the originating terminal;

transmit, from the originating terminal and to the distribution server, a start request to start a questionnaire during transmission of the first video;

transmit, from the originating terminal and to the distribution server, a results request to display results of the questionnaire to at least one viewer, wherein, in response to the instruction to distribute the first video, the distribution server distributes a second video, which corresponds to the first video, to at least one viewer terminal, wherein, in response to the start request, the distribution server provides the questionnaire to a web server device, and the web server device administers the questionnaire to the at least one viewer, wherein the distribution server receives at least one result of the questionnaire, wherein, in response to the results request, the distribution server facilitates display of the at least one result on the at least one viewer terminal, and wherein the questionnaire is stored and subsequently reproducible as stored after termination of distribution of the second video.

17. The originating terminal according to claim 16, wherein the processor is further configured to transmit to the distribution server a termination request to terminate execution of the questionnaire.

18. The originating terminal according to claim 17, wherein responses to the questionnaire are no longer accepted after the termination request is received.

19. The originating terminal according to claim 16, wherein the distribution server superimposes the at least one result over the first video, which is distributed as the second video.

20. The originating terminal according to claim 16, wherein the first video comprises a live broadcast video captured by a camera connected to the originating terminal.

* * * * *